Patented Mar. 31, 1953

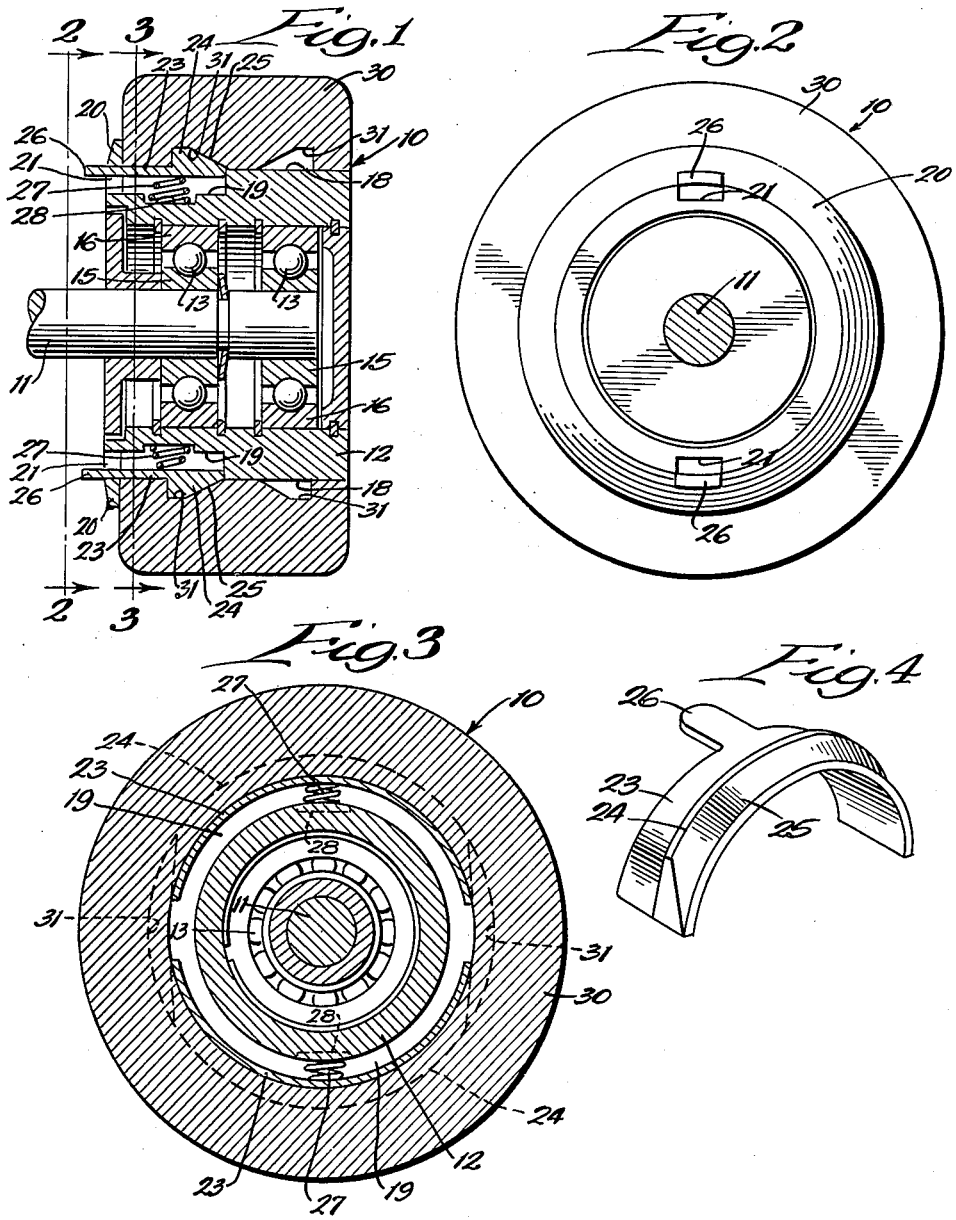

2,633,387

UNITED STATES PATENT OFFICE 2,633,387

ROLLER SKATE WHEEL

Charles S. Cooke, Joliet, and Lyle Z. Barnard, Lockport Township, Will County, Ill.

Original application June 18, 1947, Serial No. 755,362. Divided and this application January 24, 1951, Serial No. 207,468

2 Claims. (Cl. 301—5.7)

This invention relates to wheels for roller skates and this application is a division of our copending application Serial No. 755,362 filed June 18, 1947, now Patent No. 2,552,035, for improvements in Roller Skate.

The principal object of this invention is to provide an improved roller or wheel assembly for roller skates wherein a demountable tire may be readily secured to or detached from the hub of the roller or wheel.

Other objects and advantages of this invention will become apparent to those skilled in the art upon reference to the accompanying specification, claims and drawing, in which:

Fig. 1 is a vertical sectional view of the roller or wheel assembly;

Fig. 2 is a sectional view taken substantially along the line 2—2 of Fig. 1;

Fig. 3 is a sectional view taken substantially along the line 3—3 of Fig. 1; and Fig. 4 is a perspective view of one of the semi-circular rings used in the roller or wheel assembly.

The roller or wheel assembly for roller skates is generally designated at 10 and it is mounted for rotation on the conventional axle 11 of the roller skate. The roller or wheel assembly 10 includes a hub 12 rotatively carried by inner and outer ball bearings having balls 13 and races 15 and 16, the races 15 being secured to the axle 11 and the races 16 being secured to the hub 12 in any suitable manner, such as by split rings, more commonly known as snap rings.

The hub 12 is provided with an external cylindrical surface 18 and an annular groove 19. The inner side of the hub 12 is provided with a flange 20 adjacent the annular groove 19. The flange 20 is provided with a pair of diametrically opposed slots 21, the slots entering into the annular groove 19.

A pair of semi-circular rings 23 are located in the annular groove 19. These semi-circular rings 23 are each provided with a circumferential projection 24 having a cam surface 25. The semi-circular rings 23 are each provided with a projection 26 extending through the slots 21 in the flange 20. Springs 27 seating in recesses 28 in the annular groove 19 engage the under-sides of the semi-circular rings 23 for urging the same outwardly. The semi-circular rings 23 may be moved inwardly against the action of the springs by manipulating the projections 26.

A demountable tire 30 of annular configuration is received on the cylindrical surface 18 of the hub 12 and when so received the tire 30 abuts the flange 20. The demountable tire 30 is provided with a pair of grooves 31 conforming to the projections 24 on the rings 23 for receiving the semi-circular rings when they are urged outwardly by the springs 27. The tire 30 may be made of any suitable material adapted for roller skating purposes.

In placing the tire 30 on the hub 12 it is slid over the hub and in so doing the semi-circular rings 23 are forced inwardly against the action of the springs 27, this latter action being afforded by the cam surface 25 on the rings. When the tire 30 abuts the flange 20 the springs 27 snap the semi-circular rings 23 outwardly so that they engage in the inner groove 31 of the tire. Thus, the tire is securely mounted and clamped on the hub. To remove the tire 30 the projections 26 of the rings 23 are pushed inwardly to collapse the springs 27 whereby the semi-circular rings are moved inwardly to permit removal of the tire. As will be noted, the tire 30 is provided with a pair of grooves 31 so that the tire may be reversibly mounted on the hub. By reversing the tire from time to time, the wear of the tire may be maintained substantially uniform.

In this way an improved roller or wheel assembly for roller skates is provided wherein a demountable tire may be readily secured to or detached from the hub of the roller or wheel. This permits ready changing of the tires to select ones of the most suitable material for various styles of skating or various types of skating surface and it also permits reversing of the tire to provide for even wear.

While for purposes of illustration one form of this invention has been disclosed, other forms thereof may become apparent to those skilled in the art upon reference to this disclosure and, therefore, this invention is to be limited only by the scope of the appended claims.

We claim as our invention:

1. A roller for a roller skate comprising a rotatable hub having a flange and an annular groove adjacent the flange, a pair of diametrically opposed slots in the flange and communicating with the annular groove, a pair of substantially semi-circular rings in the annular groove and having projections extending through the slots and exterior circumferential projections including cam surfaces, facing away from the flange, spring means for urging the semi-circular rings outwardly, and a demountable tire received on the hub against the flange and having an internal groove conforming to the circumferential projections of the semi-circular rings for receiving the said circumferential projections to clamp the tire on the hub.

2. A roller for a roller skate comprising a rotatable hub having a flange and an annular groove adjacent the flange, a pair of diametrically opposed slots in the flange and communicating with the annular groove, a pair of substantially semi-circular rings in the annular groove and having projections extending through the slots and exterior circumferential projections including cam faces facing away from the flange, spring means for urging the semi-circular rings outwardly, and a demountable tire received on the hub against the flange and having a pair of oppositely arranged internal grooves conforming to the circumferential projections of the semi-circular rings for receiving said circumferential projections to reversibly clamp the tire on the hub.

CHARLES S. COOKE.
LYLE Z. BARNARD.

REFERENCES CITED

The following references are of record in the file of this patent:

UNITED STATES PATENTS

| Number | Name | Date |
|---|---|---|
| 390,465 | Emig | Oct. 2, 1888 |
| 1,456,375 | Forsman | May 22, 1923 |
| 2,162,696 | Burger | June 20, 1939 |
| 2,289,448 | Monroe | July 14, 1942 |
| 2,316,498 | Biczak | Apr. 13, 1943 |

FOREIGN PATENTS

| Number | Country | Date |
|---|---|---|
| 377,998 | France | 1907 |